J. H. SCHARFFENBERG.
COUNTER FLANGING MACHINE.
APPLICATION FILED APR. 14, 1916. RENEWED MAY 26, 1919.
1,327,780.
Patented Jan. 13, 1920.
2 SHEETS—SHEET 1.
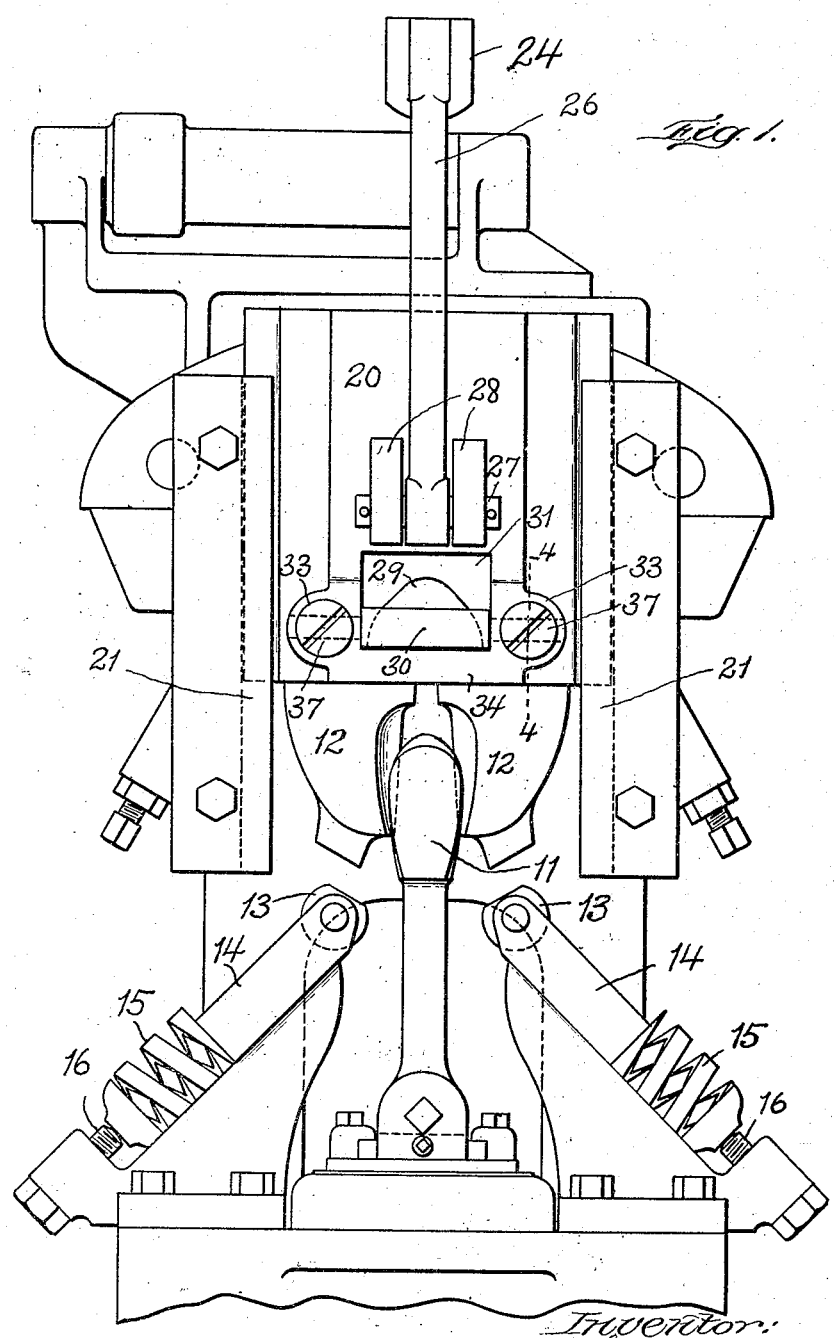

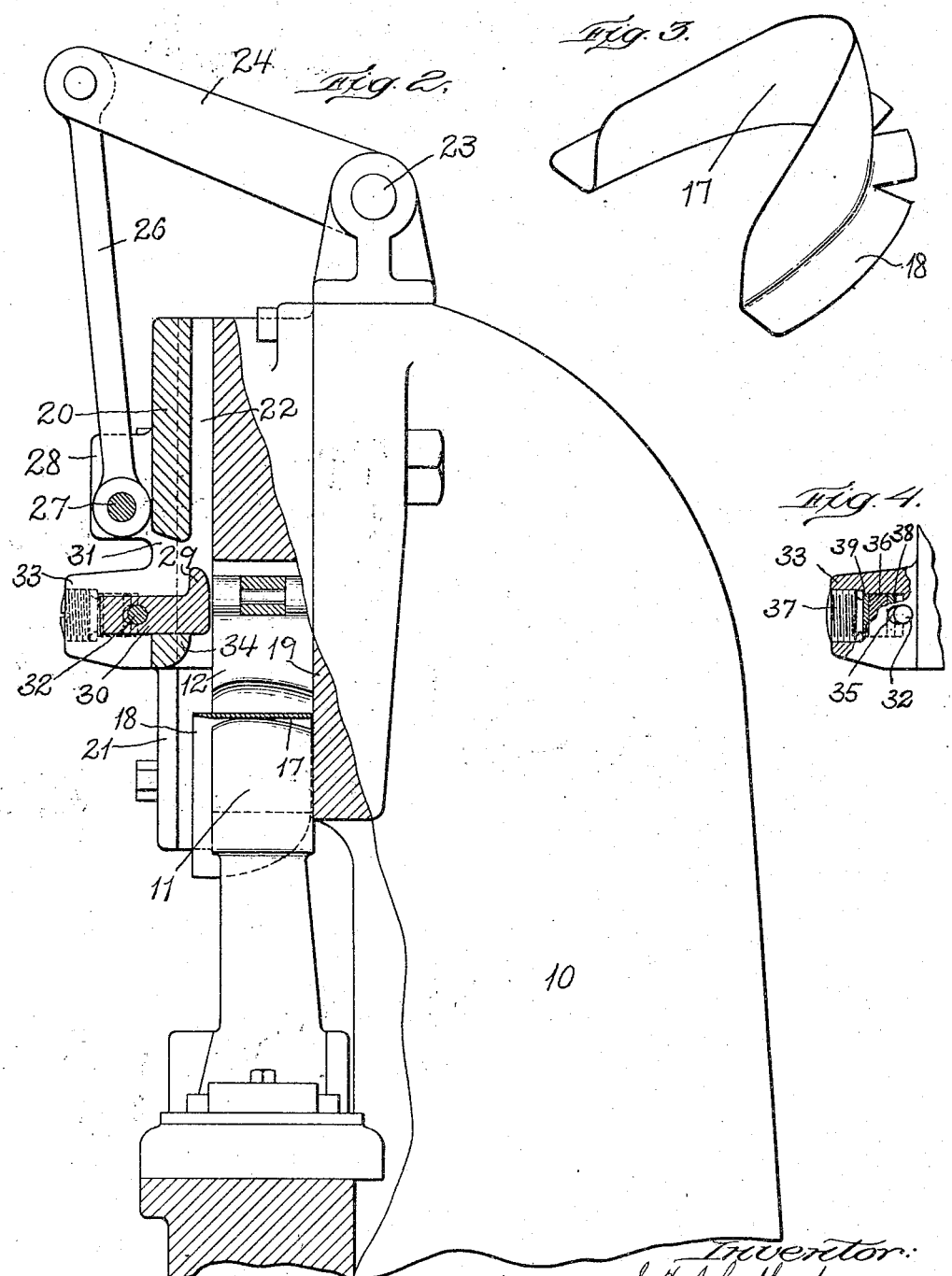

UNITED STATES PATENT OFFICE.

JEAN HENRY SCHARFFENBERG, OF LYNN, MASSACHUSETTS, ASSIGNOR TO JOHN HAMMOND STEWART, OF LYNN, MASSACHUSETTS.

COUNTER-FLANGING MACHINE.

1,327,780.  Specification of Letters Patent.  Patented Jan. 13, 1920.

Application filed April 14, 1916, Serial No. 91,067. Renewed May 26, 1919. Serial No. 299,895.

*To all whom it may concern:*

Be it known that I, JEAN HENRY SCHARFFENBERG, a subject of the King of Sweden, residing at Lynn, in the county of Essex and State of Massachusetts, have invented new and useful Improvements in Counter-Flanging Machines, of which the following is a specification.

The present invention relates to machines for molding and turning the flanges of counter stiffeners for shoes. Such counter stiffeners are commonly called "counters" in the art and will be so termed in the following description and claims. The object of the invention considered from one point of view is to adapt a standard counter molding and flanging machine to form an outwardly turned flange upon the counter. From another point of view the invention may be considered as having for its object to provide as an attachment to a counter molding machine a flange turner adapted to be substituted for the flange turner with which the standard machine is equipped, for bending out the flange of the counter in a machine organized to mold the ordinary or inwardly flanged counter; and conversely to adapt machines which are designed for molding outwardly flanged counters to form counters with inwardly turned flanges. Heretofore two distinct types of counter molding machines have been devised for producing respectively the two types of counter above mentioned, and none of such machines have been interchangeable. That is, the machines organized and adapted for forming counters with inwardly turned flanges have been capable of making only that kind of counters, while the same thing is true in regard to machines designed for molding counters with outwardly turned flanges. My object is to enable machines of either type to produce not only the character of counter for which it was originally designed, but also counters of the other type, whereby either type of machine may be used for producing both types of counter. The principle of the invention is embodied in a carrier and a flange turner associated therewith which is capable of being substituted for the flange plate of standard counter molding machines, and of which the flange turner may be constructed to form either the inwardly turned or the outwardly turned counter flange.

In the drawings forming a part of this application there is shown only the form of flange turner adapted to produce the outwardly turned counter flange, the same being associated with a carrier adapted to be used in substitution for the flange plate of a standard machine organized to mold the more common type of counter having the inwardly turned edge; this particular form of the invention being chosen for illustration and not for the purpose of indicating any limitation of the invention. Referring to the drawings, Figure 1 is a front elevation of so much of a counter molding machine having the present invention applied thereto as is sufficient to illustrate the nature of the invention.

Fig. 2 is a side elevation of the machine with parts broken away and shown in section.

Fig. 3 is a perspective view of a shoe counter having an outwardly turned flange adapted to be produced by the embodiment of the invention shown herein.

Fig. 4 is a part section and part elevation of a detail of the invention, the section being taken on line 4—4 of Fig. 1.

The same reference characters indicate the same parts in all the figures.

In the drawings 10 represents the frame, 11 the plug, last, or internal form about which the counter blank is molded, 12, 12 the parts of a divided external mold, and 13—13 the abutments by which the mold members 12, 12 are closed about the exterior of the molded counter blank, these being the parts or elements of a standard well known type of counter molding machine. The parts of the external mold are moved downward with respect to the plug or last by mechanism not shown and are closed toward the sides of the plug by reaction against the abutments 13, which are mounted upon slides 14 and bear upon springs 15 which react on adjustable abutments 16. It is immaterial what means may be used for so moving the mold members 12, since such means forms no part of the present invention. It is sufficient for the present purpose that said members are so moved and that they co-act with the plug 11 to grip and mold a counter blank, which has been placed between the plug 11 and the members 12, 12, into the required form, which is determined by the contours given to the internal plug 11 and to the surface of the cavity in the members 12, 12.

When the blank is placed between the gripping and molding members its edge projects somewhat from the outer face as indicated in Fig. 2, where the blank is shown at 17 and its projecting edge at 18. Such edge is called for the purpose of the present description the "flange edge," because it is the part which is turned or bent to form the flange. It is here shown that the depth from front to rear of the gripping mold members is less than the height or width of the counter blank, and the position of the latter is gaged by having the edge, which in the finished counter is the top edge, placed against the surface 19 of the machine frame directly back of the molding and gripping members.

The finished counter, which the machine organized as shown in these drawings is adapted to produce, is shown in Fig. 3. The numeral 17 is used to denote the counter as a whole and 18 the outwardly turned flange which is formed by bending outwardly the edge shown in Fig. 2 as projecting forwardly from the front face of the molding and gripping members.

20 represents a slide which may be called a traveler or carrier, of which the edges are confined in guides 21 so arranged that the plate or carrier is adapted to travel in opposite directions in a path parallel to and including the longitudinal axis of the molded counter. The term "longitudinal axis" as here used may be defined as meaning the line which runs from the middle of the central bend of the counter to a point midway between the ends or wings of the counter, such line being the median line of the horseshoe shaped outline into which the counter is bent in molding. The normal position of the plate 20 is that shown in the drawings, where it is above the position of the counter blank and the blank is held so that the central bend is pointed toward the plate and the wings are directed away from it. The plate 20 has on its rear or inner side a cavity or channel 22 of greater width than the width of the molded counter and of greater depth than the forward projection of the flange edge 18. Thereby the plate is adapted to be moved across the outer faces of the molding and gripping means and over the projecting edge of the counter blank without touching the latter. It is moved in this manner by a rock shaft 23 on which is secured an arm 24 connected by a link 26 with a wrist pin 27, which latter is mounted in lugs 28 on the outer face of the plate 20. The means for oscillating the rock shaft are not shown but may be of any suitable character, such as those provided with counter molding machines of the sort now in use.

The flange turner 29 is carried by the plate or carrier 20, being formed in the illustrated embodiment of the invention as a toe on a block 30 which passes through an opening 31 in the carrier and has pintles 32 mounted oscillatively in posts 33 which project forwardly from the carrier. The operative edge of the flange turner appears in Fig. 1 and has the outline of a blunt wedge with a wide curved apex and curved sides.

The pivotal mounting of the flange turner upon the carrier enables it to give way freely upon striking the flange edge of the counter during the downward or preliminary stroke of the carrier. There is no obstruction to the backward movement of the flange turner with respect to the carrier in the down travel of the latter, since the opening 31 is sufficiently wide and free so that the flange turner may pass through it. Therefore when the flange turner strikes the flange edge of the counter it is arrested, and as the carrier continues to move, the motion of the flange turner relatively thereto is a backward or upward, and outward movement, whereby it is displaced from and carried across the line of the flange edge of the counter. After passing the counter the flange turner falls back into normal position, where it bears against an abutment 34 constituted by the part of the carrier which defines the lower bound of the opening 31. This abutment holds the flange turner rigidly so that it is incapable of swinging or yielding in the opposite direction to that in which the above described relative movement takes place. Therefore upon the upward or return stroke of the carrier, the flange turner enters the open end of the counter and bends out the flange edge to form the outwardly turned flange as represented in Fig. 3.

Provision is made for yielding of the flange turner in order to avoid crushing the flange when the stock used for the counter blank is excessively thick. To permit of such yielding, the bearings wherein the pintles 32 are contained are formed as slots 35 of which the length in a direction away from the plane of the molding and gripping members is greater than the diameter of the pintles. Open sockets in the posts 33 run into these slots, and in such sockets are inserted springs 36 and adjustable abutments 37, such springs being conveniently formed as blocks of rubber and the abutments as set screws threaded into the outer ends of the sockets mentioned. Washers or wear plates 38 and 39 are arranged on both sides of each spring between the latter and the adjacent pintle and the adjacent abutment, respectively. The flange turner may thus yield away from the plane of the molding and gripping members, that is, at right angles to the direction of its travel when forming the flange, and at right angles to the direction in which thrust is applied by the abutment 34, therefore the capacity for yielding of the flange turner does not diminish the rigidity with which the flange turner is held up to its work in bending out the flange edge of the counter. That is, although the flange turner is enabled to yield away from the molding and gripping members when the material of the counter is excessively thick, nevertheless it is rigidly restrained from yielding backwardly with respect to the direction of its travel in forming the flange.

The carrier or plate with its flange turner above described takes the place of the flange plate of the standard machine which has a recess in its lower end and is adapted to encounter first the curved end of the counter blank and bend the flange inwardly on its downward stroke. The substitution may be made readily by removing the flange plate of the standard machine and replacing the same by the carrier plate 20, whereupon the machine, without other change, is adapted to form the outwardly turned counter flange.

The principles of the invention may be embodied in an obvious manner in a carrier having a flange turner adapted for forming inwardly turned flanges in the well known manner, such carrier plate being interchangeable with the flange plates of machines, organized for molding counters with outward flanges.

The descriptive terms used in the foregoing description are not to be considered as limitations of the scope of the invention, but are to be understood as merely descriptive of the particular machine shown. In this machine the arrangement and operation are vertical, with the recessed mold members above the plug or last, the flange turner carrier moving up and down, and the flange turner being operative on its up stroke. Consequently appropriate descriptive terms have been used with regard to this particular arrangement. It is to be understood, however, that the invention may be equally well embodied in a machine in which any or all of the features are reversed from the position shown, or brought into any other position or arrangement whether vertical, horizontal, or inclined, and that all such arrangements, as well as others within the description of the following claims, are embraced within the scope of the protection which I claim.

What I claim and desire to secure by Letters Patent is:

1. A counter flanging machine comprising complemental molding and gripping members adapted to hold a counter blank in molded form with its flange edge projecting, a traveler movable over such projecting edge, and a flange turner carried by said traveler and being freely movable with relation thereto in one direction, but rigidly restrained from relative motion in the opposite direction.

2. A counter flanging machine comprising complemental molding and gripping members adapted to hold a counter blank in molded form with its flange edge projecting, a flange turner, and a carrier for said flange turner; the flange turner being so mounted on the carrier as to be displaced by the flange edge when moved across the same in one direction, and being rigidly restrained from such displacement when moved in the opposite direction.

3. A counter flanging machine comprising complemental molding and gripping members adapted to hold a counter blank in molded form with its flange edge projecting, a carrier movable across such projecting edge in directions parallel with the longitudinal axis of the molded counter, and a flange turner mounted upon said carrier in position to strike said flange when the carrier crosses the latter, being free to move backward with respect to the travel of the carrier and away from said gripping members in one direction, and being restrained from such movement in the opposite direction.

4. In a counter molding machine the combination with complemental gripping and molding members adapted to hold a counter blank in molded form with its flange edge projecting, of a carrier arranged to travel across the faces of said members at such a distance therefrom as to pass said flange without engaging it, and a flange turner carried by said carrier in such a position that its path of movement crosses such flange, the flange turner being mounted to give way freely away from the said members and backwardly with respect to the travel of said carrier in one direction, and the carrier having an abutment arranged to arrest such movement of the flange turner in the opposite direction.

5. In a counter molding machine the combination with complemental gripping and molding members adapted to hold a counter blank in molded form with its flange edge projecting, of a carrier arranged to travel across the faces of said members at a distance therefrom so as to pass said flange without engaging it, and a flange turner pivoted to the carrier on an axis transverse to the path of movement of the latter, extending from its pivot toward the plane of the said members and across the plane of said flange edge, and an abutment on the carrier at one side of said flange turner rigidly resisting movement about its pivot in one direction, said flange turner being freely movable about its pivot in the opposite direction, 6. In a counter molding machine the combination with complemental gripping and molding members adapted to hold a counter blank in molded form with its flange edge projecting, of a carrier arranged to travel across the faces of said members and lying away therefrom so as to pass said flange without engaging it, and a flange turner pivoted to the carrier on an axis transverse to the path of movement of the latter, extending from its pivot toward the plane of the said members and across the plane of said flange edge, and an abutment on the carrier at one side of said flange turner rigidly resisting movement about its pivot in one direction, said flange turner being freely movable about its pivot in the opposite direction, said pivot being constructed and arranged to yield in a direction away from the molding and gripping members.

7. In a counter molding machine the combination with counter blank molding means, of a flange turner, and a means for carrying said turner back and forth across the projecting edge of a counter blank held by said molding means, said flange turner being arranged to give way when passing the counter in one direction, whereby to avoid turning the flange at that time, and being rigidly held from yielding upon the return stroke, whereby to turn the flange of the counter upon such stroke.

8. In a counter molding machine, a carrier, a flange turner having pintles mounted in bearings in said carrier, said bearings being formed to permit movement of the pintles bodily, and springs bearing upon said pintles to resist such movement.

9. In a counter molding machine, a carrier, a flange turner having pintles mounted in bearings in said carrier, said bearings being formed to permit movement of the pintles bodily, springs bearing upon said pintles to resist such movement, and an abutment on the carrier arranged to arrest rigidly pivotal movement of the flange turner in one direction, and the carrier being constructed to provide an open space permitting such movement of the flange turner in the opposite direction.

10. A flange turning means for counter molding machines comprising a carrier member having guide ribs adapted to fit the guideways for the flange plate of such a machine, a pivotally mounted flange turner carried by said carrier in a manner permitting free movement in one direction, and an abutment on the carrier arranged to prevent in a rigid manner any turning movement of the flange turner in the opposite direction.

In testimony whereof I have affixed my signature.

JEAN HENRY SCHARFFENBERG.